United States Patent
Otomaru (10) Patent No.: US 11,240,383 B2
(45) Date of Patent: Feb. 1, 2022

(54) IMAGE READING APPARATUS, DEFECT DETECTION METHOD, AND STORAGE MEDIUM

(71) Applicant: SEIKO EPSON CORPORATION, Tokyo (JP)

(72) Inventor: Soichi Otomaru, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/176,876

(22) Filed: Feb. 16, 2021

(65) Prior Publication Data

US 2021/0258433 A1 Aug. 19, 2021

(30) Foreign Application Priority Data

Feb. 19, 2020 (JP) .............. JP2020-026270

(51) Int. Cl.
*H04N 1/00* (2006.01)
*H04N 1/40* (2006.01)
*H04N 1/03* (2006.01)

(52) U.S. Cl.
CPC ..... *H04N 1/00029* (2013.01); *H04N 1/00013* (2013.01); *H04N 1/00037* (2013.01);
(Continued)

(58) Field of Classification Search
CPC ........... H04N 1/00013; H04N 1/00045; H04N 1/00068; H04N 1/00909; H04N 1/02845; H04N 1/0312; H04N 1/0318; H04N 1/193; H04N 1/401; H04N 1/4078; H04N 1/4097; H04N 2201/008; H04N 1/00–00005; H04N 1/00021–00047; H04N 1/00058–0009; H04N 1/27–31; H04N 1/32144–32352; H04N 1/38–419; H04N 1/46–648; H04N 2201/00–0006; H04N 2201/3269–3271; H04N 2201/33378;
(Continued)

(56) References Cited

U.S. PATENT DOCUMENTS

| 5,604,561 A * | 2/1997 | Ozawa | G02B 7/34 |
| | | | 396/125 |
| 8,462,209 B2 * | 6/2013 | Sun | H04N 5/2258 |
| | | | 348/144 |

(Continued)

FOREIGN PATENT DOCUMENTS

JP 2017-147587 8/2017

*Primary Examiner* — Negussie Worku
(74) *Attorney, Agent, or Firm* — Workman Nydegger (57) ABSTRACT

An image reading apparatus acquires first image data of a background portion stored in advance and read by a reading unit, acquires second image data by reading the background portion, generates third image data by increasing resolution of the first image data and fourth image data by increasing resolution of the second image data, detects an amount of shift of an image sensor relative to a lens array in a predetermined direction by shifting a specific pixel range of the fourth image data relative to the third image data and comparing the specific pixel range with the third image data, and compares fifth image data obtained by shifting the fourth image data in accordance with the shift amount with the third image data, so as to determine whether each of pixels included in the fifth image data is a defective pixel having an abnormal value.

8 Claims, 6 Drawing Sheets

(52) U.S. Cl.
CPC ..... *H04N 1/00074* (2013.01); *H04N 1/00814* (2013.01); *H04N 1/00824* (2013.01); *H04N 1/0306* (2013.01); *H04N 1/40068* (2013.01); *H04N 2201/0081* (2013.01)

(58) Field of Classification Search
CPC ....... G06K 15/025–027; G06K 15/129; G06K 15/1825; G06K 15/1826; G06K 15/1835–1847; G06K 15/1848–1855; G06K 15/1867–1881; G06K 15/1889–1898; G06K 2215/004–008; G06K 2215/0094
See application file for complete search history.

(56) References Cited

U.S. PATENT DOCUMENTS

| | | | |
|---|---|---|---|
| 9,497,380 B1* | 11/2016 | Jannard | H04N 5/23238 |
| 9,791,599 B2* | 10/2017 | Kobayashi | G01B 11/14 |
| 2006/0133792 A1* | 6/2006 | Ide | H04N 5/232123 |
| | | | 396/111 |
| 2010/0328499 A1* | 12/2010 | Sun | H04N 5/23238 |
| | | | 348/239 |
| 2017/0237878 A1* | 8/2017 | Matsumi | H04N 1/4078 |
| | | | 358/448 |

* cited by examiner

IMAGE READING APPARATUS, DEFECT DETECTION METHOD, AND STORAGE MEDIUM

The present application is based on, and claims priority from JP Application Serial Number 2020-026270, filed Feb. 19, 2020, the disclosure of which is hereby incorporated by reference herein in its entirety.

BACKGROUND

1. Technical Field

The present disclosure relates to an image reading apparatus, a defect detection method, and a storage medium storing a defect detection program.

2. Related Art

In a configuration of an image sensor including a plurality of light receiving elements arranged therein that receive light through a lens array including a plurality of lenses arranged therein, amounts of light collected by the light receiving elements differ between the vicinity of a central portion and the vicinity of an end portion in each of the lenses. Therefore, amounts of light received by individual light receiving elements have so-called lens unevenness due to the positional relationship with the lens.

An image reading apparatus including light receiving elements arranged with an interval corresponding to a predetermined number of light receiving elements, the interval corresponding to each lens, has been disclosed in JP-A-2017-147587. The image reading apparatus has a technique of obtaining first reference member data in a preparation process, obtaining second reference member data in an execution process, calculating a rate of the first reference member data to the second reference member data as discrimination data, calculating a range obtained based on a discrimination data average value obtained by averaging the discrimination data of a plurality of light receiving elements arranged apart from a target light receiving element with the interval corresponding to the predetermined number of light receiving elements as a discrimination range of the target light receiving element, and determining that the second reference member data having the discrimination data that exceeds the discrimination range as an error.

According to JP-A-2017-147587, the discrimination data of the pixels arranged with the lens interval are averaged so that the discrimination range is calculated, and in this way, it is determined whether a pixel is affected by foreign matter, such as paper dust, while influence of lens unevenness is excluded.

In the image reading apparatus, the lens array and the image sensor are fixed to respective members made of various materials, such as a housing and a substrate of the apparatus. Since heat contraction and expansion of each member change according to an environment, such as air temperature or humidity, the positional relationship between the lens array and the image sensor is not constant. Therefore, there is a difference between lens unevenness generated in one light receiving element in a certain environment and lens unevenness generated in the light receiving element in another environment. Accordingly, the change in the lens unevenness in the light receiving element that occurs according to positional shift between the lens array and the image sensor makes it difficult to determine whether a pixel is a defective pixel generated due to influence of paper dust or the like.

In order to properly determine a defective pixel while the influence of the lens unevenness is excluded, accurate detection of the positional shift that causes the change in the lens unevenness as described above is required.

SUMMARY

According to an aspect of the present disclosure, an image reading apparatus includes a reading unit including an image sensor having a plurality of light receiving elements arranged in a predetermined direction and a lens array having a plurality of arranged lenses for guiding light to the image sensor, a background portion that is a background of a reading region of the reading unit, and a control unit. The control unit obtains first background image data having reading values of the background portion read by the reading unit stored in advance for individual pixels, obtains second background image data having reading values of the background portion for individual pixels by causing the reading unit to read the background portion, generates third background image data by increasing resolution of the first background image data by performing a pixel interpolation calculation on the first background image data and fourth background image data by increasing resolution of the second background image data by performing the pixel interpolation calculation on the second background image data, detects an amount of shift of the image sensor relative to the lens array in the predetermined direction by performing a comparison process of shifting a specific pixel range including a number of pixels of the fourth background image data relative to the third background image data and comparing the specific pixel range with the third background image data, and determines whether each of pixels included in fifth background image data obtained by shifting the fourth background image data in accordance with the shift amount is a defective pixel having an abnormal value by comparing the fifth background image data with the third background image data.

According to another aspect of the present disclosure, a defect detection method for detecting a defect in an image generated by an image reading apparatus including a reading unit having an image sensor including a plurality of light receiving elements arranged in a predetermined direction and a lens array including a plurality of lenses arranged to guide light to the image sensor and a background portion serving as a background of a reading area of the reading unit includes a first acquisition step of acquiring first background image data having reading values of the background portion read by the reading unit stored in advance for individual pixels, a second acquisition step of acquiring second background image data having reading values of the background portion read by the reading unit for individual pixels, an interpolation step of generating third background image data by increasing resolution of the first background image data by performing a pixel interpolation calculation on the first background image data and generating fourth background image data by increasing resolution of the second background image data by performing the pixel interpolation calculation on the second background image data, a shift amount detection step of detecting a shift amount of the image sensor relative to the lens array in the predetermined direction by performing a comparison process of shifting a specific pixel range including a number of pixels of the fourth background image data relative to the third background image data and comparing the specific pixel range with the third background image data, and a defect detection step of determining whether each of pixels included in fifth background image data obtained by shifting the fourth background image data in accordance with the shift amount is a defective pixel having an abnormal value by comparing the fifth background image data with the third background image data.

According to a further aspect of the present disclosure, a non-transitory computer-readable storage medium stores a defect detection program for detecting a defect in an image generated by an image reading apparatus including a reading unit having an image sensor including a plurality of light receiving elements arranged in a predetermined direction and a lens array including a plurality of lenses arranged to guide light to the image sensor and a background portion serving as a background of a reading area of the reading unit. The defect detection program causes a processor to execute a first acquisition function of acquiring first background image data having reading values of the background portion read by the reading unit stored in advance for individual pixels, a second acquisition function of acquiring second background image data having reading values of the background portion read by the reading unit for individual pixels, an interpolation function of generating third background image data by increasing resolution of the first background image data by performing a pixel interpolation calculation on the first background image data and generating fourth background image data by increasing resolution of the second background image data by performing the pixel interpolation calculation on the second background image data, a shift amount detection function of detecting a shift amount of the image sensor relative to the lens array in the predetermined direction by performing a comparison process of shifting a specific pixel range including a number of pixels of the fourth background image data relative to the third background image data and comparing the specific pixel range with the third background image data, and a defect detection function of determining whether each of pixels included in fifth background image data obtained by shifting the fourth background image data in accordance with the shift amount is a defective pixel having an abnormal value by comparing the fifth background image data with the third background image data.

DESCRIPTION OF EXEMPLARY EMBODIMENTS

Hereinafter, embodiments of the present disclosure will be described with reference to the accompanying drawings. Note that each figure is merely an example for illustrating the embodiment. Since each figure is an example, proportions and shapes of components may not be accurate, the same components may not be consistent with each other, or some parts may be omitted.

1. APPARATUS CONFIGURATION

Figure 1:
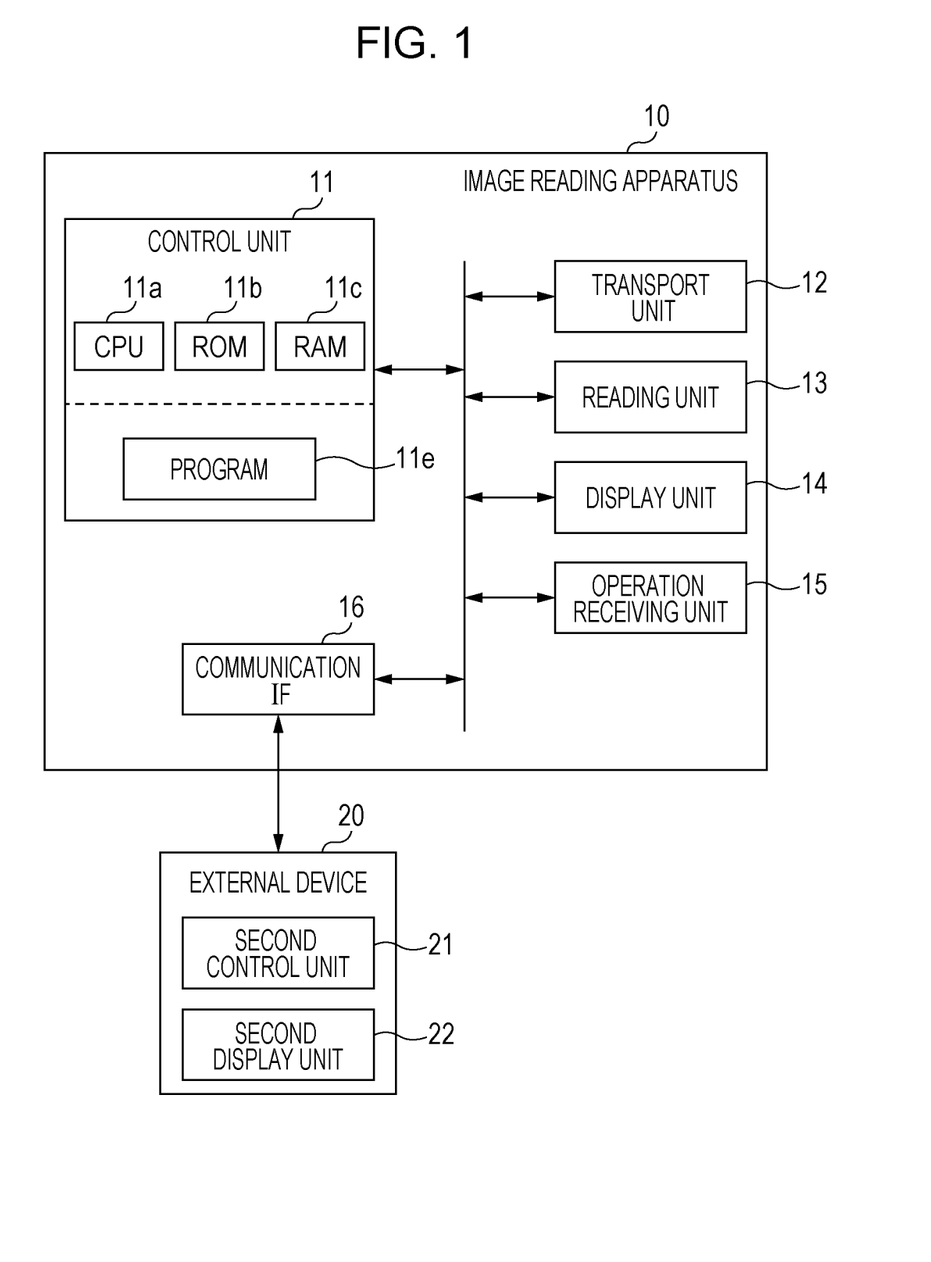
FIG. 1 is a block diagram schematically illustrating a configuration of an image reading apparatus.

FIG. 1 is a block diagram schematically illustrating a configuration of an image reading apparatus 10 according to this embodiment.

Figure 2:
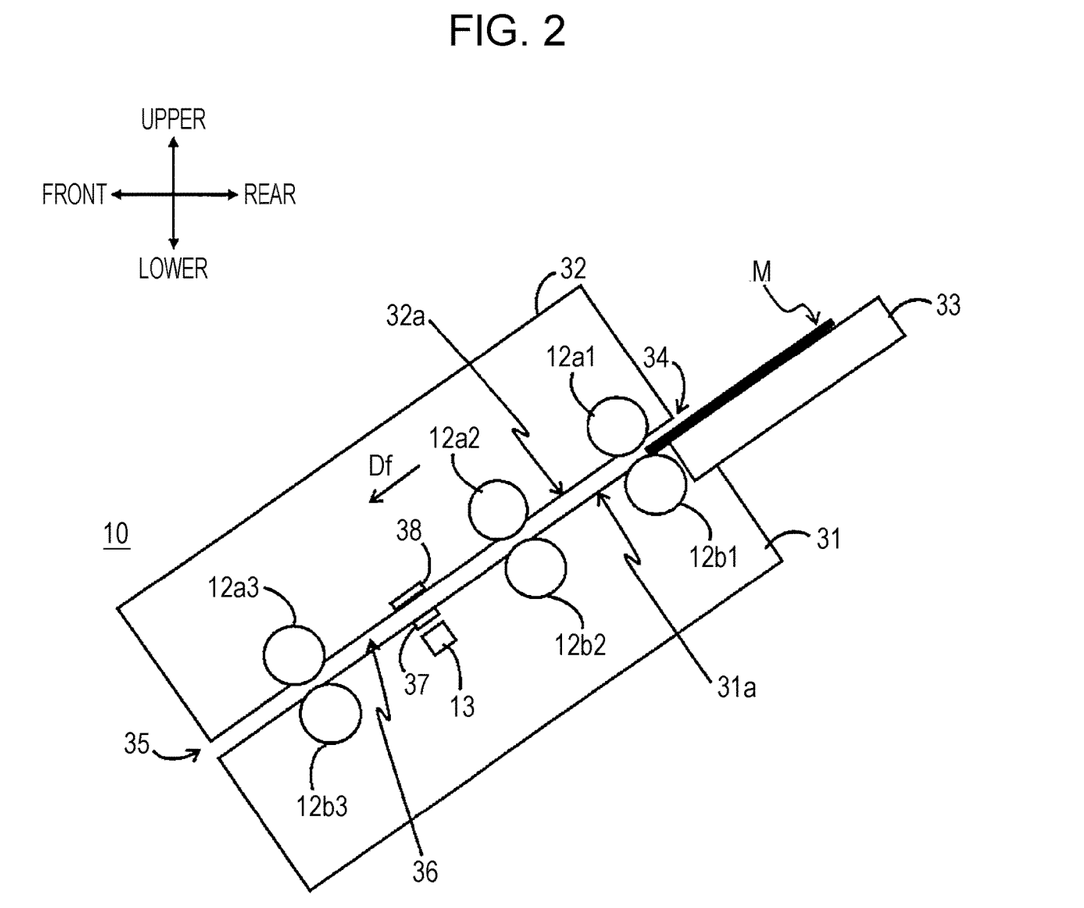
FIG. 2 is a side view schematically illustrating an internal structure of the image reading apparatus including a transport path.

FIG. 2 a side view schematically illustrating an internal structure of the image reading apparatus 10 including a transport path 36. In FIG. 2, vertical and front-back directions of the image reading apparatus 10 are illustrated.

The image reading apparatus 10 is a scanner capable of reading a document. The image reading apparatus 10 realizes a defect detection method for detecting a defect in an image generated by reading. The image reading apparatus 10 includes a control unit 11, a transport unit 12, a reading unit 13, a display unit 14, an operation receiving unit 15, and a communication interface 16. The interface is abbreviated as IF.

The control unit 11 includes, for example, a CPU 11$a$ serving as a processor, a memory, such as a ROM 11$b$ and a RAM 11$c$, and other storage units, and controls the image reading apparatus 10 in accordance with a program 11$e$ stored in the memory. At least a part of the program 11$e$ corresponds to a defect detection program. The processor constituting the control unit 11 is not limited to one CPU, and may be configured to perform processing by a plurality of CPUs or a hardware circuit, such as an ASIC (Application Specific Integrated Circuit) or configured to perform processing using a CPU and a hardware circuit in cooperation.

The image reading apparatus 10 includes a main body unit 31 and a cover 32 that can be openable with respect to the main body unit 31. The main body unit 31 and the cover 32 may be collectively referred to as a housing of the image reading apparatus 10. As shown in FIG. 2, the transport path 36 for the document M is formed inside the image reading apparatus 10 using the main body unit 31 and the cover 32.

The transport unit 12 transports the document M from an upstream to a downstream of the transport path 36 under control of the control unit 11. The direction from the upstream to the downstream of the transport path 36 may be referred to as a transport direction Df. The upstream and the downstream of the transport path 36 are also simply described as an upstream and a downstream. The document M is typically a paper medium, but may be a sheet-like medium made of a material other than paper. The transport unit 12 includes a plurality of rollers for transporting the document M and a motor that gives power to the rollers to rotate the rollers.

A reference numeral 34 indicates a supply port 34 on the upstream of the transport path 36, and a reference numeral 35 indicates a discharge port 35 on the downstream of the transport path 36. A document tray 33 is attached to the main body unit 31 at a rear of the main body unit 31. The document M mounted on the document tray 33 is taken into the transport path 36 from the supply port 34, transported downstream through the transport path 36, and discharged to an outside from the discharge port 35. In the example of FIG. 2, the discharge port 35 is positioned in a front portion relative to the supply port 34.

The reading unit 13 is disposed in the main body unit 31 and optically reads the document M under control of the control unit 11. The reading unit 13 includes a light source that emits light to irradiate the document M and a background plate 38 described hereinafter, an image sensor that receives reflected light from the document M or the like and outputs an electric charge in accordance with an amount of the received light, and an optical system, such as a lens, for guiding light to the image sensor.

The reading unit 13 may read a surface of the document M transported by the transport unit 12, the surface facing the main body unit 31. That is, in the example of FIG. 2, the image reading apparatus 10 is a sheet feed scanner that may read one side of the document M. However, the image reading apparatus 10 may obviously have a mechanism for reversing the surface of the document M so that the reading unit 13 may read one surface and the other surface of the document M in order. Alternatively, the image reading apparatus 10 may have a reading unit different from the reading unit 13 in the cover 32 so that the two reading units simultaneously read both sides of the document M.

The display unit 14 is a unit that displays visual information, and is composed of, for example, a liquid crystal display or an organic electroluminescence (EL) display. The operation receiving unit 15 is a unit that receives an operation performed by the user, and is, for example, a physical button or a touch panel. The touch panel may be realized as one function of the display unit 14. Although omitted in FIG. 2, the display unit 14 and the operation receiving unit 15 are provided at positions in the housing that are easily visible and operated by the user.

The communication IF 16 is a general term for one or a plurality of IFs for the image reading apparatus 10 to perform wired or wireless communication with an outside in accordance with a predetermined communication protocol including general communication standards. In the example of FIG. 1, the image reading apparatus 10 is communicably connected to an external device 20 via the communication IF 16. The image reading apparatus 10 may be a multifunction peripheral having a plurality of functions, such as a printing function, a facsimile communication function, and an e-mail communication function, in addition to the function as a scanner.

The external device 20 is, for example, a personal computer (PC), a server, a smartphone, a tablet terminal, or the like. In FIG. 1, a configuration of the external device 20 is also simply illustrated, and the external device 20 includes a second control unit 21 that controls the external device 20 and a second display unit 22 that displays visual information. Various processes, such as the defect detection method described as being executed by the control unit 11 of the image reading apparatus 10 in this embodiment, may be performed by the external device 20 obtaining required data from the image reading apparatus 10 using resources, such as the second control unit 21.

As illustrated in FIG. 2, the transport path 36 is a gap ensured in a portion between a main body upper surface 31a that is a surface of the main body unit 31 facing upward, and a cover lower surface 32a that is a surface of the cover 32 facing downward. The transport path 36 is formed by the main body upper surface 31a, the cover lower surface 32a, and rollers 12a1, 12a2, 12a3, 12b1, 12b2, 12b3.

FIG. 2 shows several pairs of rollers facing each other across the transport path 36 as rollers forming a part of the transport unit 12. One of the roller pairs formed by the roller 12a1 and the roller 12b1 is referred to as a first pair of the rollers 12a1 and 12b1. One of the other roller pairs formed by the roller 12a2 and the roller 12b2 is referred to as a second pair of the rollers 12a2 and 12b2. The other of the roller pairs formed by the roller 12a3 and the roller 12b3 is referred to as a third pair of the rollers 12a3 and 12b3. The rollers 12a1, 12a2, and 12a3 are arranged on the cover 32, and the rollers 12b1, 12b2, and 12b3 are arranged on the main body unit 31. Each of the roller pairs transports the document M by being rotated while sandwiching the document M between the rollers forming the pair.

The first pair of rollers 12a1 and 12b1 on the most upstream in all the roller pairs is arranged at a position slightly downstream of the supply port 34. The first pair of rollers 12a1 and 12b1 takes one of the documents M mounted on the document tray 33 into the transport path 36 and transports the document M downstream. The second pair of rollers 12a2 and 12b2 located downstream of the first pair of rollers 12a1 and 12b1 and upstream of the reading unit 13 transports the document M transported by the first pair of rollers 12a1 and 12b1 further downstream. When the document M transported by the second pair of rollers 12a2 and 12b2 passes through a position of the reading unit 13 in the transport path 36, the document M is read by the reading unit 13. The third pair of rollers 12a3 and 12b3 which is located on the most downstream in all the roller pairs is arranged downstream relative to the reading unit 13. The third pair of rollers 12a3 and 12b3 transports the document M transported by the second pair of rollers 12a2 and 12b2 further downstream, and discharges the document M to an outside from the discharge port 35.

A glass plate 37 serving as a transparent portion that transmits light is disposed on the main body upper surface 31a so as to correspond to the reading portion 13. The glass plate 37 is exposed in the transport path 36. The light in the transport path 36 is incident on the main body unit 31 via the glass plate 37, and the reading unit 13 receives the incident light by the image sensor through the optical system, such as a lens, so as to perform reading. The material of the transparent portion is not limited to glass, and may be plastic, for example.

A background plate 38 serving as a background portion is disposed in a position on the cover lower surface 32a facing the glass plate 37. The background plate 38 is painted in a predetermined color, for example, a gray color. The background plate 38 may be a part of the cover lower surface 32a or may be a member attached to the cover lower surface 32a. In this way, the reading unit 13 performs reading through the glass plate 37 in a position facing the background plate 38 with the glass plate 37 interposed therebetween. A region of the transport path 36 corresponding to the glass plate 37, that is, a region sandwiched between the glass plate 37 and the background plate 38 is a reading region of the reading unit 13.

Figure 3:
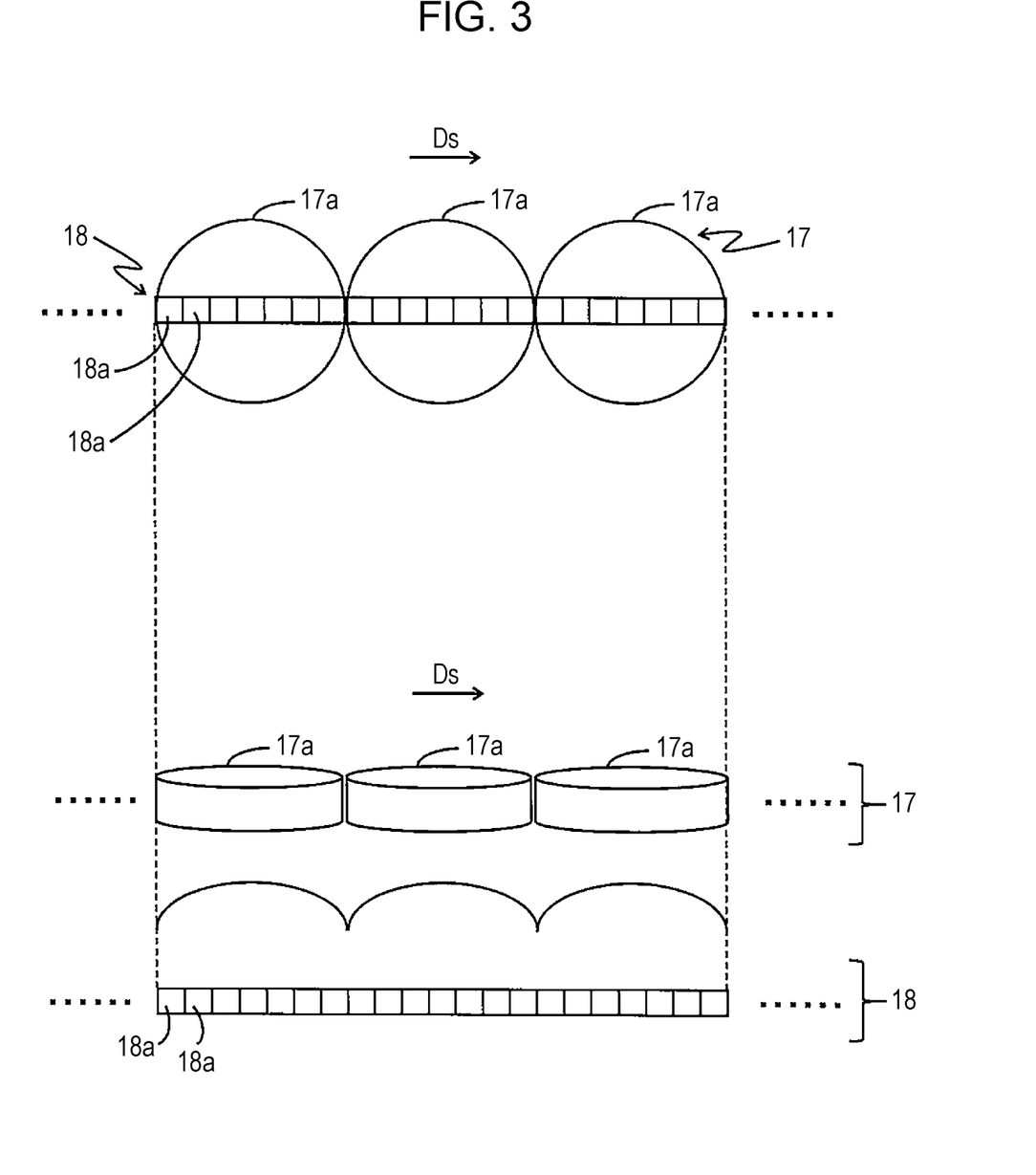
FIG. 3 is a diagram illustrating the relationship between a lens array and an image sensor.

FIG. 3 is a diagram illustrating the relationship between the lens array 17 and the image sensor 18 included in the reading unit 13. In FIG. 3, the positional relationship between the lens array 17 and the image sensor 18 behind the lens array 17 in a line of sight facing the lens array 17 is illustrated in an upper portion in the drawing, and the positional relationship between the lens array 17 and the image sensor 18 in a line of sight orthogonal to the line of sight facing the lens array 17 is illustrated in a lower portion in the drawing. The lens array 17 is configured by arranging a plurality of lenses 17a in a predetermined direction Ds, and the image sensor 18 is configured by arranging a plurality of light receiving elements 18a in the direction Ds. The light receiving elements 18a are photoelectric conversion elements. The direction Ds is a direction intersecting the transport direction Df, and is a longitudinal direction of the lens array 17 and the image sensor 18. This longitudinal direction is also referred to as a main scanning direction Ds. The main scanning direction Ds is perpendicular to the drawing of FIG. 2. It may be understood that the transport direction Df and the main scanning direction Ds are orthogonal to each other.

The image sensor 18 repeats a process of generating and outputting image data for each line. The image data for each line is a pixel line in which reading values for individual light receiving elements 18a, that is, pixel values, are arranged in the main scanning direction Ds. In the configuration in FIG. 3, a diameter of each of the circular lenses 17a is, for example, approximately 0.3 mm, and resolution of the image sensor 18 in the main scanning direction Ds, that is, the number of light receiving elements per inch, is 600 dpi. In this case, approximately seven light receiving elements 18a are arranged in the main scanning direction Ds for one lens 17a.

A curve drawn between each of the lenses 17a and the corresponding light receiving elements 18a in the lower portion in FIG. 3 illustrates an amount of light collected by the individual light receiving elements 18a through the lens 17a. The curve represents different amounts of light received by the individual light receiving elements 18a, that is, lens unevenness. According to the example of FIG. 3, paying attention to the relationship between one of the lenses 17a and the corresponding light receiving elements 18a, one of the light receiving elements 18a at a position corresponding to a central portion of the lens 17a receives more light than the other light receiving elements 18a located near end portions of the lens 17a. Therefore, paying attention to one of the light receiving elements 18a, when the positional relationship between the light receiving element 18a and the lens 17a changes along the main scanning direction Ds, the lens unevenness in the light receiving element 18a also changes.

A "shift amount" detected in this embodiment is an amount of shift of the image sensor 18 relative to the lens array 17 in the main scanning direction Ds.

2. DEFECT DETECTION PROCESS

Figure 4:
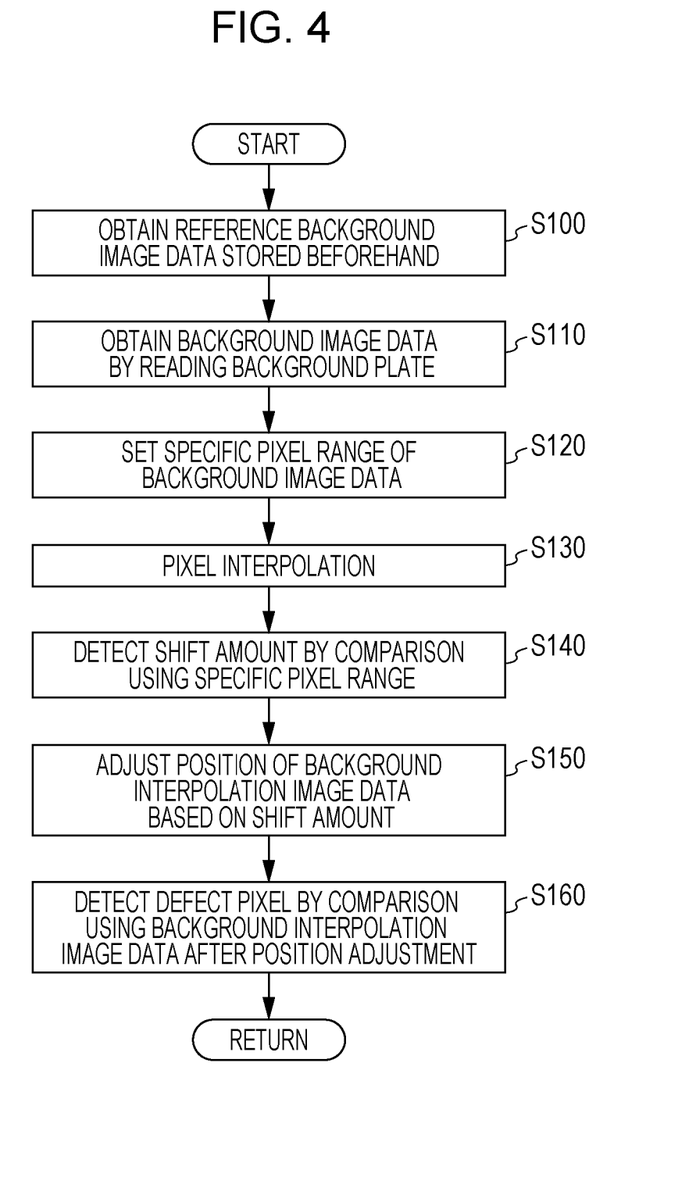
FIG. 4 is a flowchart of a defect detection process.

FIG. 4 is a flowchart of a defect detection process executed by the control unit 11 in accordance with the program 11e. The defect detection process is performed to detect a defect in an image generated by reading performed by the reading unit 13. Specifically, the defect detection process detects a defective pixel having an abnormal pixel value due to influence of foreign matter, such as paper dust or other dust. The control unit 11 starts the defect detection process when, for example, an instruction for executing scanning on the document M is received through the operation receiving unit 15 or the communication IF 16.

In step S100, the control unit 11 acquires "reference background image data" stored in advance. The reference background image data is image data having reading values of the background plate 38 for individual pixels, which are generated by the reading unit 13 reading the background plate 38 in a state in which the document M does not exist in the transport path 36, and corresponds to "first background image data". Step S100 corresponds to a first acquisition step. For example, the reference background image data is generated in a product assembly process before the image reading apparatus 10 is shipped from a factory, and is stored in a predetermined memory, such as the ROM 11b of the control unit 11. Therefore, the control unit 11 may acquire the reference background image data stored in the predetermined memory.

The reference background image data is generated by reading in a sort of ideal environment where there is no or almost no foreign matter, such as paper dust, in the image reading apparatus 10. Furthermore, the reference background image data is image data for one line. For example, the reference background image data is generated, based on image data of individual lines repeatedly generated by the reading unit 13 repeatedly reading the background plate 38, by averaging pixel values for each pixel position x. The pixel position x is a coordinate in an X-axis direction defined as a direction representing the main scanning direction Ds in image processing. The control unit 11 recognizes the pixel positions x of the individual pixels constituting the image data with reference to a predetermined origin (x=0). The origin is, for example, a pixel position of one of opposite ends of the pixel line generated by the reading unit 13.

In step S110, the control unit 11 acquires "background image data" by causing the reading unit 13 to read the background plate 38. Similar to the reference background image data, the background image data is image data for one line having reading values of the background plate 38 for individual pixels that are generated by the reading unit 13 reading the background plate 38 in a state where the document M does not exist in the transport path 36. The background image data corresponds to "second background image data". Step S110 corresponds to a second acquisition step.

The method of generating background image data is the same as the method of generating reference background image data. However, a timing of step S110 and a timing when the reference background image data is generated are different in terms of time and an environment in which the image reading apparatus 10 is installed. Therefore, at the timing of step S110, the positional relationship between the lens array 17 and the image sensor 18 may have changed as compared with the timing when the reference background image data is generated. The change in the positional relationship between the lens array 17 and the image sensor 18 changes the lens unevenness received by the light receiving elements 18a. Furthermore, at the timing of step S110, the background image data may be affected by foreign matter, such as paper dust or other dust, due to the presence of the foreign matter in the image reading apparatus 10. Therefore, even when the background image data is simply compared with the reference background image data for each pixel position x to obtain a difference in a pixel value for each pixel position x, it may not be determined whether the difference is obtained due to influence of foreign matter or the change in lens unevenness.

In step S120, the control unit 11 sets a specific pixel range including a plurality of pixels of a portion of the background image data. The specific pixel range is a pixel range used for a shift amount detection process to be performed in step S140, which will be described later. In this embodiment, a pixel range in which pixel values are relatively stable without being affected by foreign matter, such as paper dust, is set as the specific pixel range.

Therefore, the control unit 11 sets a pixel range including a predetermined number of consecutive pixels having differences from adjacent pixels equal to or smaller than a predetermined value in the background image data as the specific pixel range. The difference between pixels is a difference between pixel values of pixels. The terms "reading value" and "pixel value" indicate, for example, a gradation value for each R, G, or B (red, green, and blue). In addition, R, G, and B may be converted to luminance by a general conversion formula. As an example, the control unit 11 sets a value of about 5% of an average value of luminance of pixels included in the background image data as a predetermined value, and sets a pixel range including a predetermined number of consecutive pixels having luminance differences from their adjacent pixels equal to or smaller than the predetermined value as the specific pixel range. The control unit 11 may set only one specific pixel range in the background image data. However, it is assumed here that a plurality of specific pixel ranges are set in the background image data.

Figure 5:
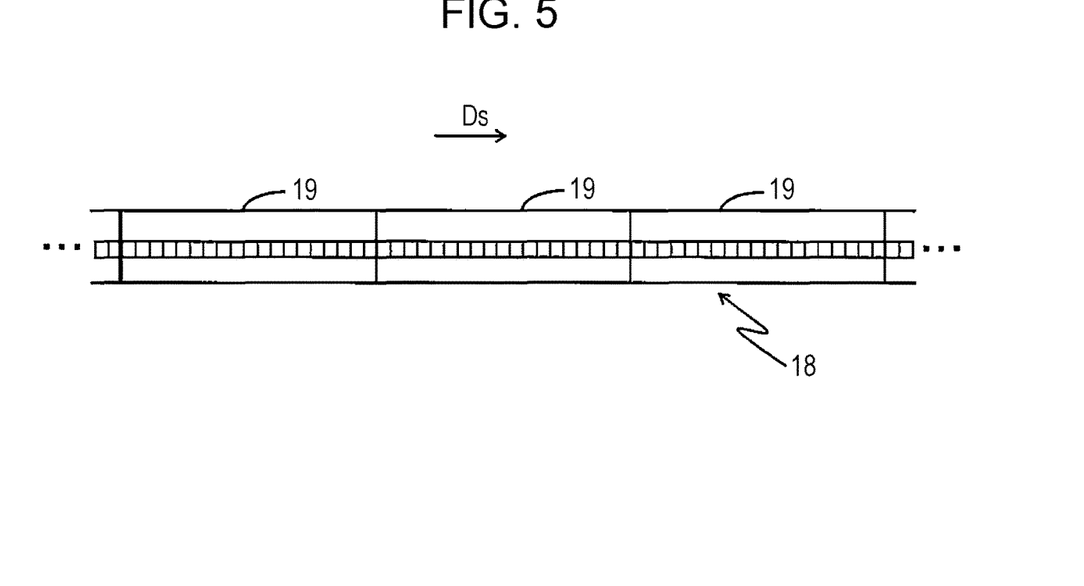
FIG. 5 is a diagram illustrating an example of a configuration of the image sensor.

FIG. 5 is a diagram illustrating a configuration example of the image sensor 18. The image sensor 18 is configured by connecting a plurality of sensor chips 19 each of which includes the plurality of light receiving elements 18a arranged in the main scanning direction Ds in the main scanning direction Ds. In FIG. 5, each of a plurality of small rectangles in the sensor chips 19 represents a light receiving element. Although not illustrated exactly in FIG. 5, one sensor chip 19 has, for example, hundreds of light receiving elements. In step S120, the control unit 11 may set at least one specific pixel range for each pixel range corresponding to each of the sensor chips 19 in the background image data.

In step S130, the control unit 11 increases resolution of the reference background image data by performing a pixel interpolation calculation on the reference background image data acquired in step S100, and further increases resolution of the background image data by performing the pixel interpolation calculation on the background image data acquired in step S110. Step S130 corresponds to an interpolation step. The image data obtained by increasing the resolution of the reference background image data is referred to as "reference background interpolated image data". The reference background interpolated image data corresponds to "third background image data". The image data obtained by increasing the resolution of the background image data is referred to as "background interpolated image data". The background interpolated image data corresponds to "fourth background image data".

As in the above example, when the resolution of the image sensor 18 in the main scanning direction Ds is 600 dpi, resolutions of the reference background image data and the background image data are also 600 dpi. In step S130, the control unit 11 generates the reference background interpolated image data and the background interpolated image data having resolutions of 2400 dpi by, for example, quadrupling the resolutions of the reference background image data and the background image data.

Since the pixel interpolation calculation performed on the reference background image data and the pixel interpolation calculation performed on the background image data are the same method, an example of the pixel interpolation calculation performed on the reference background image data will now be described in detail. The control unit 11 generates reference background image data of 1200 dpi by interpolating one pixel in interpolation positions between pixels constituting the reference background image data of 600 dpi, and then generates reference background image data of 2400 dpi, that is, reference background interpolated image data, by interpolating one pixel in interpolation positions between the pixels constituting the reference background image data of 1200 dpi.

When performing such interpolation, the control unit 11 interpolates the pixels in the interpolation positions by performing weighting addition with reference to pixels located adjacent to the interpolation positions and pixels located in the vicinity of the interpolation positions excluding the adjacent pixels. For example, it is assumed that an intermediate point between a pixel in a pixel position x=N and a pixel in a pixel position x=N+1 that are continuous in the X-axis direction is set as a new interpolation position. In this case, the control unit 11 performs the interpolation by weighting addition with reference to a pixel in a pixel position x=N−1 adjacent to the pixel position x=N on a negative side in the X-axis direction and a pixel in a pixel position x=N+2 adjacent to the pixel position x=N+1 on a positive side in the X-axis direction in addition to the pixel in the pixel position x=N adjacent to the interpolation position on the negative side in the X-axis direction and the pixel in the pixel position x=N+1 adjacent to the interpolation position on the positive side in the X-axis direction. The negative side in the X-axis direction is closer to an origin of the X-axis, and the positive side in the X-axis direction is farther from the origin of the X-axis.

By performing such interpolation, an interpolation result that more accurately represents a degree of lens unevenness for pixel positions after the interpolation may be obtained, as compared with simple interpolation that refers only to adjacent pixels that sandwich interpolation positions. Note that the control unit 11 may employ, for example, an interpolation method using a polynomial, such as spline interpolation, as the pixel interpolation calculation performed on the reference background image data and the background image data.

In step S140, the control unit 11 moves the specific pixel range in the background interpolated image data with respect to the reference background interpolated image data and performs a comparison process with the reference background interpolated image data, so that an amount of shift of the image sensor 18 relative to the lens array 17 in the main scanning direction Ds is detected. Step S140 corresponds to a shift amount detection step.

Figure 6:
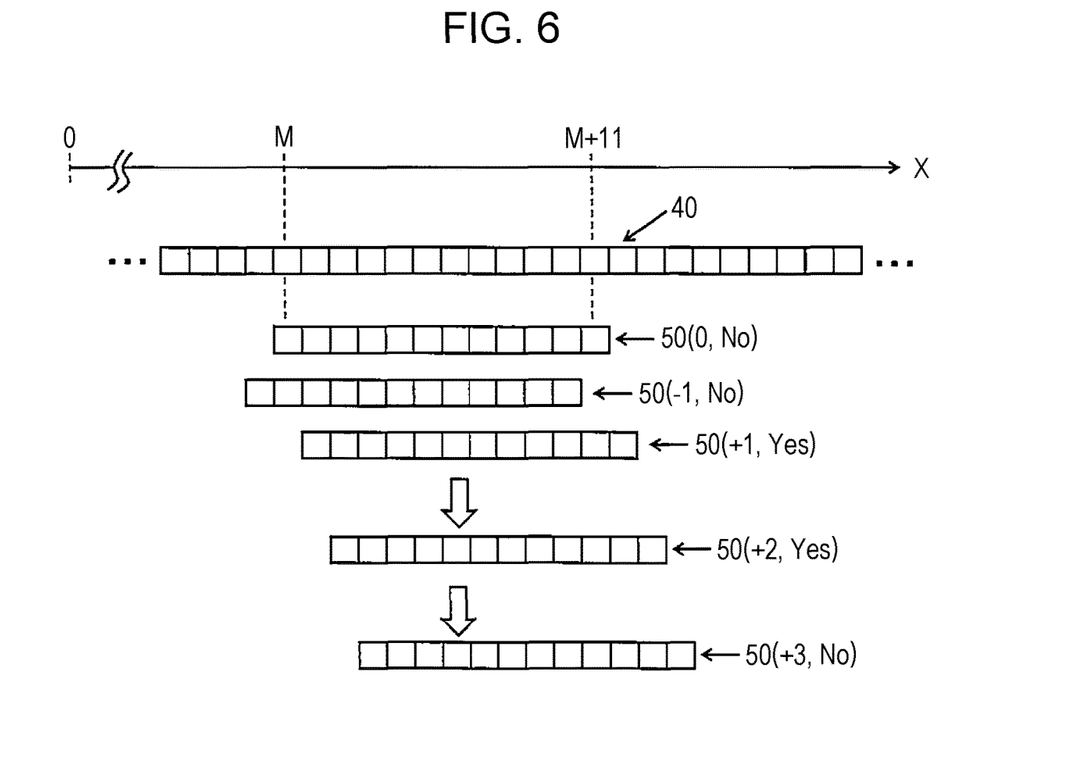
FIG. 6 is a diagram for explaining step S140.

FIG. 6 is a diagram illustrating an example of the shift amount detection performed in step S140. A reference numeral 40 indicates reference background interpolated image data, and a reference numeral 50 indicates a specific pixel range in the background interpolated image data. In FIG. 6, individual rectangles represent pixels included in the reference background interpolated image data 40 and the specific pixel ranges 50.

In step S120, a specific pixel range is set in the background image data before the pixel interpolation calculation to be performed in step S130. The specific pixel ranges 50 illustrated in FIG. 6 is a pixel range obtained as a result of increase in resolutions of the specific pixel range set in the background image data in step S120 in the X-axis direction through step S130. Therefore, the specific pixel range in the background image data and the specific pixel range in the background interpolated image data may be regarded as substantially the same range. The control unit 11 may set a specific pixel range in the background interpolated image data after step S130 without executing step S120.

In the example of FIG. 6, in the background interpolated image data, 12 consecutive pixels located in a pixel position x=M to a pixel position x=M+11 based on the origin (x=0) of the X axis constitute one specific pixel range 50. Note that "M" in FIG. 6 is a certain number indicating the pixel position x, and has nothing to do with "M" indicating the document in FIG. 2. First, the control unit 11 compares the specific pixel range 50 with the reference background interpolated image data 40 in three different states in which the shift amount is 0, −1, and +1. In FIG. 6, values, such as "−1", described in parentheses next to the reference numeral 50 indicate shifts based on the shift amount of 0. A unit of the shift amount corresponds to a size of one pixel in resolution of the image data obtained after the pixel interpolation calculation performed in step S130. According to the above detailed example, the unit of the shift amounts is 1 inch× 1/2400.

When comparing the specific pixel range 50 with the reference background interpolated image data 40 with the shift amount of 0, the control unit 11 may simply compare each of the pixels of the specific pixel ranges 50 with a pixel in a common pixel position x. When a pixel in the pixel position x=M in the specific pixel range 50 is taken as an example, the pixel in the pixel position x=M in the specific pixel range 50 is compared with a pixel in the pixel position x=M in the reference background interpolated image data 40 so that a difference between pixel values is calculated. Similarly, when a pixel in a pixel position x=M+11 in the specific pixel ranges 50 is taken as an example, the pixel in the pixel position x=M+11 in the specific pixel range 50 is compared with a pixel in the pixel position x=M+11 of the reference background interpolated image data 40 so that a difference between pixel values is calculated. The control unit 11 executes such comparison with the reference background interpolated image data 40 for each pixel in the specific pixel ranges 50, so as to obtain an average of absolute values of differences obtained by the comparison performed on the individual pixels as a difference from the reference background interpolated image data 40.

When comparing the specific pixel range 50 with the reference background interpolated image data 40 with a shift amount of −1, the control unit 11 shifts the individual pixels included in the specific pixel ranges 50 by one pixel to the negative side in the X-axis direction, and in this state, compares the individual pixels in the specific pixel ranges 50 with the individual pixels included in the reference background interpolated image data 40. When the pixel in the pixel position x=M in the specific pixel ranges 50 is taken as an example, the pixel in the pixel position x=M in the specific pixel range 50 is compared with a pixel in a pixel position x=M−1 in the reference background interpolated image data 40 so that a difference between pixel values is calculated. More specifically, the pixel in the pixel position x=M in the specific pixel range 50 is temporarily shifted to the pixel position x=M−1, and then is compared with the pixel in the same pixel position x=M−1 in the reference background interpolated image data 40. Similarly, when a pixel in a pixel position x=M+11 in the specific pixel range 50 is taken as an example, the pixel in the pixel position x=M+11 in the specific pixel range 50 is compared with a pixel in a pixel position x=M+10 of the reference background interpolated image data 40 so that a difference between pixel values is calculated. Even in the state in which the shift amount is −1, the control unit 11 compares the individual pixels included in the specific pixel range 50 with the reference background interpolated image data 40, and obtains an average of absolute values of differences obtained by the comparison as a difference from the interpolated image data 40.

When comparing the specific pixel ranges 50 with the reference background interpolated image data 40 with a shift amount of +1, the control unit 11 shifts the individual pixels included in the specific pixel ranges 50 by one pixel to the positive side in the X-axis direction, and in this state, compares the individual pixels in the specific pixel ranges 50 with the individual pixels included in the reference background interpolated image data 40. When the pixel in the pixel position x=M in the specific pixel range 50 is taken as an example, the pixel in the pixel position x=M in the specific pixel range 50 is compared with a pixel in the pixel position x=M in the reference background interpolated image data 40 so that a difference between pixel values is calculated. More specifically, the pixel in the pixel position x=M in the specific pixel ranges 50 is temporarily shifted to the pixel position x=M+1, and then is compared with the pixel in the same pixel position x=M+1 of the reference background interpolated image data 40. Similarly, when a pixel in a pixel position x=M+11 in the specific pixel range 50 is taken as an example, the pixel in the pixel position x=M+11 in the specific pixel range 50 is compared with a pixel in a pixel position x=M+12 of the reference background interpolated image data 40 so that a difference between pixel values is calculated. Even in the state where the shift amount is +1, the control unit 11 compares the individual pixels included in the specific pixel range 50 with the reference background interpolated image data 40, and obtains an average of absolute values of differences obtained by the comparison as a difference from the interpolated image data 40.

The control unit 11 selects a shift amount which corresponds to a smallest difference among the differences between the specific pixel ranges 50 and the reference background interpolated image data 40 calculated in the three states in which the shift amount is 0, −1, and +1. In FIG. 6, "Yes" in "Yes/No" written in parentheses next to the reference numerals 50 indicates that a difference from the reference background interpolated image data 40 is smaller. That is, in the example of FIG. 6, among the difference from the reference background interpolated image data 40 calculated with the shift amount of 0, the difference from the reference background interpolated image data 40 calculated with the shift amount of −1, and the difference from the reference background interpolated image data 40 calculated with the shift amount of +1, the difference calculated with the shift amount of +1 is smallest. Therefore, the control unit 11 selects the shift amount of +1.

When selecting the shift amount of +1, the control unit 11 further shifts the specific pixel ranges 50 to the positive side in the X-axis direction by one pixel to perform the same comparison. On the other hand, when selecting the shift amount of −1, the control unit 11 further shifts the specific pixel ranges 50 to the negative side in the X-axis direction by one pixel to perform the same comparison. When selecting the shift amount of 0, the control unit 11 determines the shift amount of 0 as a detection result, and terminates the process in step S140.

As described above, when selecting the shift amount of +1, the control unit 11 compares the specific pixel range 50 with the reference background interpolated image data 40 with the shift amount of +2. That is, in a state in which the individual pixels in the specific pixel ranges 50 are shifted by two pixels to the positive side in the X-axis direction relative to the case where the shift amount is 0, the individual pixels included in the specific pixel ranges 50 are compared with the individual pixels included in the reference background interpolated image data 40 so that a difference from the reference background interpolated image data 40 is obtained. Then, when the difference from the reference background interpolated image data 40 calculated with the shift amount of +2 is smaller than the difference from the reference background interpolated image data 40 corresponding to the shift amount of +1 which has been calculated, the control unit 11 performs the same comparison after further shifting the specific pixel range 50 to the positive side in the X-axis direction by one pixel. On the other hand, when the difference from the reference background interpolated image data 40 calculated with the shift amount of +2 is equal to or larger than the difference from the reference background interpolated image data 40 calculated with the shift amount of +1, it can be said that decrease in the difference from the reference background interpolated image data 40 has stopped in the position corresponding to the shift amount of +1, and therefore, the control unit 11 determines the shift amount of +1 as a detection result and terminates the process in step S140.

In the example of FIG. 6, the difference from the reference background interpolated image data 40 calculated with the shift amount of +2 is smaller than the difference from the reference background interpolated image data 40 calculated with the shift amount of +1. Therefore, in the example of FIG. 6, the control unit 11 compares the specific pixel range 50 with the reference background interpolated image data 40 with a shift amount of +3. That is, in a state in which the individual pixels in the specific pixel range 50 are shifted by three pixels to the positive side in the X-axis direction as compared with the case where the shift amount is 0, the pixels are compared with the pixels included in the reference background interpolated image data 40 so that a difference from the reference background interpolated image data 40 is obtained as described above. Then, when the difference from the reference background interpolated image data 40 calculated with the shift amount of +3 is smaller than the difference from the reference background interpolated image data 40 corresponding to the shift amount of +2 which has been calculated, the control unit 11 performs the same comparison after further shifting the specific pixel range 50 to the positive side in the X-axis direction by one pixel. On the other hand, when the difference from the reference background interpolated image data 40 calculated with the shift amount of +3 is equal to or larger than the difference from the reference background interpolated image data 40 calculated with the shift amount of +2, it can be said that the decrease in the difference from the reference background interpolated image data 40 has stopped in the position corresponding to the shift amount of +2, and therefore, the control unit 11 determines the shift amount of +2 as a detection result and terminates the process in step S140. In FIG. 6, since the difference from the reference background interpolated image data 40 calculated with the shift amount of +3 is larger than the difference from the reference background interpolated image data 40 calculated with the shift amount of +2, the shift amount of +2 is determined as a detection result and the process in step S140 is terminated, for example.

As described above, in step S140, the control unit 11 repeatedly performs the comparison between the specific pixel range 50 with the reference background interpolated image data 40 and the shift of the specific pixel range 50 in a direction in which the difference between the specific pixel range 50 and the reference background interpolated image data 40 decreases, and detects an amount of the shift of the specific pixel range 50 performed until the decrease in the difference stops as a shift amount.

Although the specific pixel range 50 included in the background interpolated image data in one position is illustrated in FIG. 6, a plurality of specific pixel ranges are included in the background interpolated image data in a plurality of positions away from each other in the X-axis direction. Accordingly, the shift of the specific pixel range 50 and the comparison with the reference background interpolated image data 40 described with reference to FIG. 6 are processes that are commonly performed for all the specific pixel ranges. The control unit 11 may calculate a difference between the specific pixel range corresponding to one shift amount and the reference background interpolated image data 40 based on the comparison between all the specific pixel ranges and the reference background interpolated image data 40.

In step S150, the control unit 11 adjusts a position of the background interpolated image data relative to the reference background interpolated image data by shifting the entire background interpolated image data in accordance with the shift amount detected in step S140. For example, when the shift amount detected in step S140 is "+2", the control unit 11 shifts the entire background interpolated image data by two pixels from the state of the shift amount of 0 to the positive side in the X-axis direction. The background interpolated image data obtained after the shift performed in step S150 corresponds to "fifth background image data".

In step S160, the control unit 11 compares the background interpolated image data with the reference background interpolated image data after the shift in step S150 by pixel values of the pixels in the same pixel position x at that time, so as to determine whether each of the pixels included in the background interpolated image data is a defective pixel having an abnormal value. The control unit 11 may detect a pixel of background interpolated image data in which a difference of pixel values at the time of the comparison exceeds a predetermined threshold value as a defective pixel. By comparing the background interpolated image data obtained after the shift in step S150 with the reference background interpolated image data, pixel values having the same or almost the same degree of lens unevenness may be compared, and therefore, it may be determined whether the pixels are defective pixels affected by foreign matter, such as paper dust, while influence of the lens unevenness is eliminated. Step S160 corresponds to a defect detection step. The control unit 11 executes step S160 and then terminates the flowchart of FIG. 4.

Needless to say, the control unit 11 may execute a process reflecting the detection result of the defective pixel performed in step S160 after the process in step S160.

For example, when detecting a defective pixel as a result of the process in step S160, the control unit 11 may notify the outside of a result of the detection. Specifically, a user interface (UI) screen for notifying the user that a defective pixel has been detected is displayed in the display unit 14 or the second display unit 22 of the external device 20. Such a UI screen may include a message and an illustration, and the user who visually recognizes the UI screen may take a concrete action for removing foreign matter, such as paper dust. Examples of the concrete action include cleaning of a glass plate 37 after the cover 32 is opened. Needless to say, the UI screen may include content for notifying the user of positions of, the number of, and sizes of regions in the glass plate 37 where foreign matter is expected to be attached according to the detected defective pixels.

Furthermore, after step S160, the control unit 11 may control the transport unit 12 and the reading unit 13 to execute transport and reading of the document M mounted on the document tray 33. Then, the control unit 11 may correct document image data, which is image data generated by the reading unit 13 reading the document M, in accordance with a result of the detection of the defective pixel performed in step S160. That is, correction for removing an abnormal value generated by influence of foreign matter, such as paper dust, is performed, among pixels constituting the document image data, on a pixel in which the pixel position x is determined to correspond to a position of a defective pixel in accordance with a result of the detection of the defective pixel performed in step S160. For example, a pixel value of a pixel in which the pixel position x is determined to correspond to a position of a defective pixel among the pixels constituting the document image data may be replaced by a pixel value generated by the interpolation calculation with reference to a plurality of neighboring pixels.

3. CONCLUSION

As described above, according to this embodiment, the image reading apparatus 10 includes the reading unit 13 including the image sensor 18 having the plurality of light receiving elements 18a arranged in the predetermined direction Ds and the lens array 17 having the plurality of lenses 17a arranged therein for guiding light to the image sensor 18, the background portion serving as a background of a reading area of the reading unit 13, and the control unit 11. Then, the control unit 11 acquires first background image data having reading values of the background portion read by the reading unit 13 stored in advance for individual pixels, acquires second background image data having reading values of the background portion obtained by reading on the background portion performed by the reading unit 13, generates third background image data obtained by increasing resolution of the first background image data by performing a pixel interpolation calculation on the first background image data, and generates fourth background image data obtained by increasing resolution of the second background image data by performing the pixel interpolation calculation on the second background image data. Furthermore, the control unit 11 performs a comparison process of shifting a specific pixel range including a number of pixels of the fourth background image data relative to the third background image data and comparing the specific pixel range with the third background image data so as to detect an amount of shift of the image sensor 18 relative to the lens array 17 in the direction Ds, and compares fifth background image data obtained by shifting the fourth background image data in accordance with the shift amount with the third background image data so as to determine whether each of pixels included in the fifth background image data is a defective pixel having an abnormal value.

With this configuration, the control unit 11 compares the third background image data with the fourth background image data which are obtained by increasing the resolution of the first background image data and the resolution of the second background image data, respectively. In this case, the specific pixel range included in the fourth background image data is shifted relative to the third background image data for comparison. As a result, the shift amount may be detected more accurately. It is assumed that the first background image data and the second background image data generated by the image sensor 18 having resolution in the direction Ds of 600 dpi are respectively increased in resolution by four times in the X-axis direction so that the third background image data and the fourth background image data of 2400 dpi are obtained. In this case, the shift amount may be detected in a minute unit of 1 inch×1/2400. Then, by comparing the fifth background image data with the third background image data, the control unit 11 may accurately detect a defective pixel generated by influence of paper dust or the like while substantially eliminating the influence of lens unevenness even in a state in which the image sensor 18 is displaced with respect to the lens array 17 in the direction Ds.

Furthermore, according to this embodiment, the control unit 11 may generate pixels in interpolation positions by performing weighting addition with reference to pixels adjacent to the interpolation positions and pixels in the vicinity of the interpolation positions excluding the adjacent pixels in the pixel interpolation calculation.

According to the above configuration, the third background image data and the fourth background image data may be obtained as an interpolation result that accurately represents a degree of lens unevenness with respect to the pixel positions after the interpolation.

Furthermore, according to this embodiment, in the comparison process, the control unit 11 repeatedly performs the comparison between the specific pixel range and the third background image data and the shift of the specific pixel range in a direction in which a difference between the specific pixel range and the third background image data is reduced so as to detect an amount of the shift of the specific pixel range until decrease in the difference is stopped as the shift amount.

With this configuration, the current shift amount may be accurately detected, based on a state of the image reading apparatus 10 obtained when the first background image data is generated, by specifying a shift amount when the difference between the specific pixel range and the third background image data is minimized.

Furthermore, according to this embodiment, the control unit 11 may set a pixel range including a predetermined number of consecutive pixels having differences from adjacent pixels equal to or smaller than a predetermined value as a specific pixel range.

With this configuration, in the second background image data and the fourth background image data, a pixel range including pixels having stable pixel values may be set as a specific pixel range while pixels having reading values corresponding to foreign matter, such as paper dust, are avoided.

Furthermore, according to this embodiment, the image sensor 18 may be configured by connecting a plurality of sensor chips 19 including a plurality of light receiving elements 18a arranged in the predetermined direction Ds in the predetermined direction Ds, and the control unit 11 may set at least one specific pixel range for each pixel range corresponding to one sensor chip 19.

The different sensor chips 19 may have different photoelectric conversion characteristics. At least one specific pixel range is set for each pixel range corresponding to one sensor chip 19 and each specific pixel range is compared with the third background image data so that a more reasonable value may be detected as the current shift amount based on the state of the image reading apparatus 10 obtained when the first background image data is generated.

This embodiment also discloses techniques in categories other than the image reading apparatus 10.

A defect detection method detecting a defect in an image generated by the image reading apparatus 10 including the reading unit 13 having the image sensor 18 including a plurality of light receiving elements 18a arranged in a predetermined direction Ds and a lens array 17 including a plurality of lenses 17a arranged to guide light to the image sensor 18, and a background portion serving as a background of a reading area of the reading unit 13 including a first acquisition step of acquiring first background image data having reading values of the background portion read by the reading unit 13 stored in advance for individual pixels, a second acquisition step of acquiring second background image data having reading values of the background portion read by the reading unit 13 for individual pixels, an interpolation step of generating third background image data by increasing resolution of the first background image data by performing a pixel interpolation calculation on the first background image data and generating fourth background image data by increasing resolution of the second background image data by performing the pixel interpolation calculation on the second background image data, a shift amount detection step of detecting a shift amount of the image sensor 18 relative to the lens array 17 in the predetermined direction Ds by performing a comparison process of shifting a specific pixel range including a number of pixels of the fourth background image data relative to the third background image data and comparing the specific pixel range with the third background image data, and a defect detection step of determining whether each of pixels included in fifth background image data obtained by shifting the fourth background image data in accordance with the shift amount is a defective pixel having an abnormal value by comparing the fifth background image data with the third background image data.

A defect detection program 11e for detecting a defect in an image generated by the image reading apparatus 10 including the reading unit 10 having the image sensor 18 including the plurality of light receiving elements 18a arranged in the predetermined direction Ds and the lens array 17 including the plurality of lenses 17a arranged to guide light to the image sensor 18, and the background portion serving as a background of a reading area of the reading unit 13 causes a CPU 11a serving as a processor to execute a first acquisition function of acquiring first background image data having reading values of the background portion read by the reading unit 13 stored in advance for individual pixels, a second acquisition function of acquiring second background image data having reading values of the background portion read by the reading unit 13 for individual pixels, an interpolation function of generating third background image data by increasing resolution of the first background image data by performing a pixel interpolation calculation on the first background image data and generating fourth background image data by increasing resolution of the second background image data by performing the pixel interpolation calculation on the second background image data, a shift amount detection function of detecting a shift amount of the image sensor 18 relative to the lens array 17 in the predetermined direction by performing a comparison process of shifting a specific pixel range including a number of pixels of the fourth background image data relative to the third background image data and comparing the specific pixel range with the third background image data, and a defect detection function of determining whether each of pixels included in fifth background image data obtained by shifting the fourth background image data in accordance with the shift amount is a defective pixel having an abnormal value by comparing the fifth background image data with the third background image data.

Furthermore, as one of the embodiments, the control unit 11 may issue a warning to the outside when the shift amount exceeds a predetermined threshold value for the shift amount. That is, the control unit 11 issues a warning when the shift amount detected in step S140 exceeds the predetermined threshold value. A timing when the warning is issued may be after step S140, after step S160, or after the control unit 11 acquires the document image data after step S160. Specifically, the control unit 11 causes the display unit 14 or the second display unit 22 of the external device 20 to display a warning screen.

Figure 7:
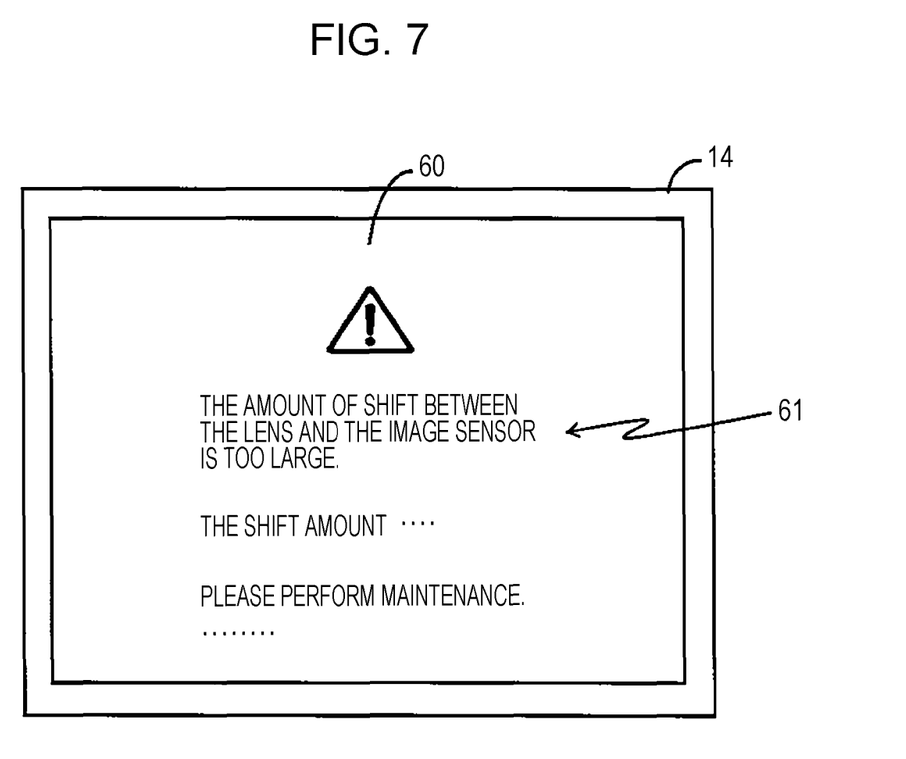
FIG. 7 is a diagram illustrating an example of a warning screen.

FIG. 7 is an example of a warning screen 60 displayed in the display unit 14. The warning screen 60 includes a message 61. The message 61 includes text "The amount of shift between the lens and the image sensor is too large". The message 61 may include a numerical value indicating the shift amount detected in step S140 or a message indicating that maintenance of the product should be performed. The user who visually recognizes the warning screen 60 may perform required repairs on the product or request a service person to repair.

The image reading apparatus 10 may be a so-called flatbed scanner instead of the sheet feed scanner as illustrated in FIG. 2. That is, in a state where the document M mounted on a platen made of a glass plate or the like serving as a transparent portion is sandwiched between the platen and the background portion, the reading unit 13 may read the document M and the background portion while being shifted on the opposite side of the background portion of the platen. In this case, the transport unit 12 is not required.

What is claimed is:

1. An image reading apparatus, comprising:
   a reading unit including an image sensor having a plurality of light receiving elements arranged in a predetermined direction and a lens array having a plurality of arranged lenses for guiding light to the image sensor;
   a background portion that is a background of a reading region of the reading unit; and
   a control unit, wherein
   the control unit
      obtains first background image data having reading values of the background portion read by the reading unit stored in advance for individual pixels,
      obtains second background image data having reading values of the background portion for individual pixels by causing the reading unit to read the background portion,
      generates third background image data by increasing resolution of the first background image data by performing a pixel interpolation calculation on the first background image data, and generates fourth background image data by increasing resolution of the second background image data by performing the pixel interpolation calculation on the second background image data,
      detects an amount of shift of the image sensor relative to the lens array in the predetermined direction by performing a comparison process of shifting a specific pixel range including a number of pixels of the fourth background image data relative to the third background image data and comparing the specific pixel range with the third background image data, and
      determines whether each of pixels included in fifth background image data obtained by shifting the fourth background image data in accordance with the shift amount is a defective pixel having an abnormal value by comparing the fifth background image data with the third background image data.

2. The image reading apparatus according to claim 1, wherein,
   in the pixel interpolation calculation, the control unit generates pixels in the interpolation positions by weighting addition with reference to adjacent pixels adjacent to the interpolation positions and pixels in the vicinity of the interpolation positions excluding the adjacent pixels.

3. The image reading apparatus according to claim 1, wherein,
   in the comparison process, the control unit repeatedly performs the comparison between the specific pixel range and the third background image data and the shift of the specific pixel range in a direction in which a difference between the specific pixel range and the third background image data is decreased so as to detect an amount of the shift of the specific pixel range until the decrease in the difference is stopped as the shift amount.

4. The image reading apparatus according to claim 1, wherein
a pixel range including a predetermined number of consecutive pixels having differences from adjacent pixels are equal to or smaller than a predetermined value is set as the specific pixel range.

5. The image reading apparatus according to claim 4, wherein
the image sensor is configured by connecting, in the predetermined direction, a plurality of sensor chips including a plurality of light receiving elements arranged in the predetermined direction, and
the control unit sets at least one specific pixel range for each pixel range corresponding to one sensor chip.

6. The image reading apparatus according to claim 1, wherein
the control unit issues a warning to the outside when the shift amount exceeds a predetermined threshold value for the shift amount.

7. A defect detection method for detecting a defect in an image generated by an image reading apparatus including a reading unit having an image sensor including a plurality of light receiving elements arranged in a predetermined direction and a lens array including a plurality of lenses arranged to guide light to the image sensor, and a background portion serving as a background of a reading area of the reading unit, the defect detection method comprising:
a first acquisition step of acquiring first background image data having reading values of the background portion read by the reading unit stored in advance for individual pixels;
a second acquisition step of acquiring second background image data having reading values of the background portion read by the reading unit for individual pixels;
an interpolation step of generating third background image data by increasing resolution of the first background image data by performing a pixel interpolation calculation on the first background image data and generating fourth background image data by increasing resolution of the second background image data by performing the pixel interpolation calculation on the second background image data;
a shift amount detection step of detecting a shift amount of the image sensor relative to the lens array in the predetermined direction by performing a comparison process of shifting a specific pixel range including a number of pixels of the fourth background image data relative to the third background image data and comparing the specific pixel range with the third background image data; and
a defect detection step of determining whether each of pixels included in fifth background image data obtained by shifting the fourth background image data in accordance with the shift amount is a defective pixel having an abnormal value by comparing the fifth background image data with the third background image data.

8. A non-transitory computer-readable storage medium storing a defect detection program for detecting a defect in an image generated by an image reading apparatus including a reading unit having an image sensor including a plurality of light receiving elements arranged in a predetermined direction and a lens array including a plurality of lenses arranged to guide light to the image sensor, and a background portion serving as a background of a reading area of the reading unit, the defect detection program comprising:
a first acquisition function of acquiring first background image data having reading values of the background portion read by the reading unit stored in advance for individual pixels;
a second acquisition function of acquiring second background image data having reading values of the background portion read by the reading unit for individual pixels;
an interpolation function of generating third background image data by increasing resolution of the first background image data by performing a pixel interpolation calculation on the first background image data and generating fourth background image data by increasing resolution of the second background image data by performing the pixel interpolation calculation on the second background image data;
a shift amount detection function of detecting a shift amount of the image sensor relative to the lens array in the predetermined direction by performing a comparison process of shifting a specific pixel range including a number of pixels of the fourth background image data relative to the third background image data and comparing the specific pixel range with the third background image data; and
a defect detection function of determining whether each of pixels included in fifth background image data obtained by shifting the fourth background image data in accordance with the shift amount is a defective pixel having an abnormal value by comparing the fifth background image data with the third background image data.

* * * * *